United States Patent
Liebert, Jr. et al.

(10) Patent No.: US 6,733,207 B2
(45) Date of Patent: May 11, 2004

(54) ENVIRONMENTAL REMEDIATION SYSTEM AND METHOD

(76) Inventors: Thomas R. Liebert, Jr., 5402 Crown Colony, Houston, TX (US) 77069; Christopher J. Penza, 460 Calle Portilla, Camarillo, CA (US) 93010

(*) Notice: Subject to any disclaimer, the term of this patent is extended or adjusted under 35 U.S.C. 154(b) by 0 days.

(21) Appl. No.: 10/098,096

(22) Filed: Mar. 14, 2002

(65) Prior Publication Data

US 2003/0175082 A1 Sep. 18, 2003

(51) Int. Cl.[7] ............ B09C 1/08; E21B 43/26; B09B 1/00
(52) U.S. Cl. ............ 405/128.25; 405/128.5; 405/128.75; 175/70
(58) Field of Search ............ 405/128.25, 128.3, 405/128.45, 128.5, 128.7, 128.75; 175/70, 64, 67

(56) References Cited

U.S. PATENT DOCUMENTS

| | | | | |
|---|---|---|---|---|
| 1,547,461 A | * | 7/1925 | Steele ............ | 175/60 |
| 1,658,305 A | * | 2/1928 | Russell ............ | 166/401 |
| 3,546,886 A | * | 12/1970 | Jones et al. ............ | 405/269 |
| 4,088,191 A | * | 5/1978 | Hutchison ............ | 166/223 |
| 4,624,327 A | * | 11/1986 | Reichman ............ | 175/67 |
| 4,624,606 A | * | 11/1986 | Nakanishi et al. ............ | 405/269 |
| 4,694,911 A | * | 9/1987 | Kennedy ............ | 173/62 |
| 4,718,503 A | * | 1/1988 | Stewart ............ | 175/70 |
| 4,776,409 A | * | 10/1988 | Manchak, Jr. ............ | 175/50 |
| 4,786,212 A | * | 11/1988 | Bauer et al. ............ | 405/269 |
| 4,792,237 A | * | 12/1988 | Hara ............ | 366/296 |
| 4,834,194 A | * | 5/1989 | Manchak, Jr. ............ | 175/50 |
| 5,061,119 A | * | 10/1991 | Balthaus et al. ............ | 405/128.45 |
| 5,133,625 A | * | 7/1992 | Albergo et al. ............ | 405/263 |
| 5,275,513 A | * | 1/1994 | Geary et al. ............ | 405/266 |
| 5,435,176 A | * | 7/1995 | Manchak, III ............ | 73/152.43 |
| 5,535,836 A | | 7/1996 | Cagianut et al. | |
| 5,560,737 A | * | 10/1996 | Schuring et al. ............ | 405/128.45 |
| 5,645,377 A | * | 7/1997 | Kauschinger et al. ............ | 405/269 |
| 5,868,523 A | | 2/1999 | Nickell et al. | |
| 5,908,267 A | * | 6/1999 | Schuring et al. ............ | 405/128.65 |
| 5,980,446 A | * | 11/1999 | Loomis et al. ............ | 588/250 |
| 6,012,517 A | * | 1/2000 | Schuring et al. ............ | 166/53 |
| 6,020,185 A | * | 2/2000 | Hince et al. ............ | 435/262 |
| 6,254,524 B1 | * | 7/2001 | Kauschinger ............ | 588/249 |
| 6,306,296 B1 | * | 10/2001 | Kerfoot ............ | 210/170 |
| 6,344,355 B1 | * | 2/2002 | Hince et al. ............ | 435/262 |
| 6,543,539 B1 | * | 4/2003 | Vinegar et al. ............ | 166/296 |
| 2002/0143226 A1 | * | 10/2002 | Saha et al. ............ | 588/205 |

OTHER PUBLICATIONS

Reardon Environmental, Inc "Site Cleanup—Insitu Chemical Oxidation for Soil and Groundwater Contamination" 7 pages, undated.*

* cited by examiner

*Primary Examiner*—James R. Brittain
*Assistant Examiner*—Katherine Mitchell
(74) *Attorney, Agent, or Firm*—Kenneth L. Nash

(57) ABSTRACT

The present invention provides an environmental remediation system and method. In one embodiment, the system comprises a nozzle formed from a plurality of tubulars mounted parallel with respect to each other. In one embodiment, a mixing chamber may be provided adjacent the nozzle tip to allow mixing of different fluid just before injection. In another embodiment, different fluids may remain segregated until after injection into the media. The invention may comprise electronic sensors for monitoring the reactions and other physical phenomena. The invention may comprise a control system that may control fluid flow ratios, automatically shut off pumps in response to an operator's command or in response to sensor signals detected. Fluids may be pumped sequentially through one or more tubulars into the media. A packer may be provide to keep fluid within the media. A fluid recovery system may be provided for drawing off and storing excess fluids.

35 Claims, 11 Drawing Sheets

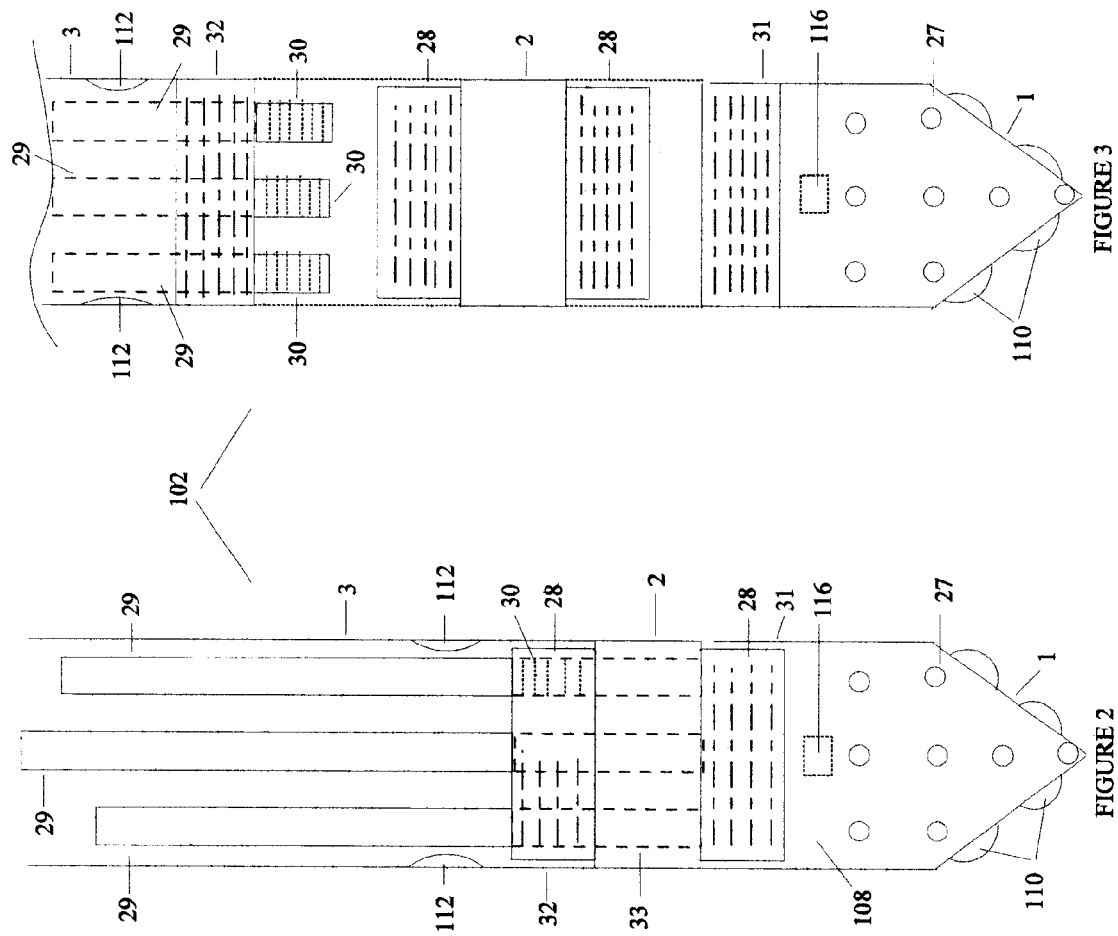

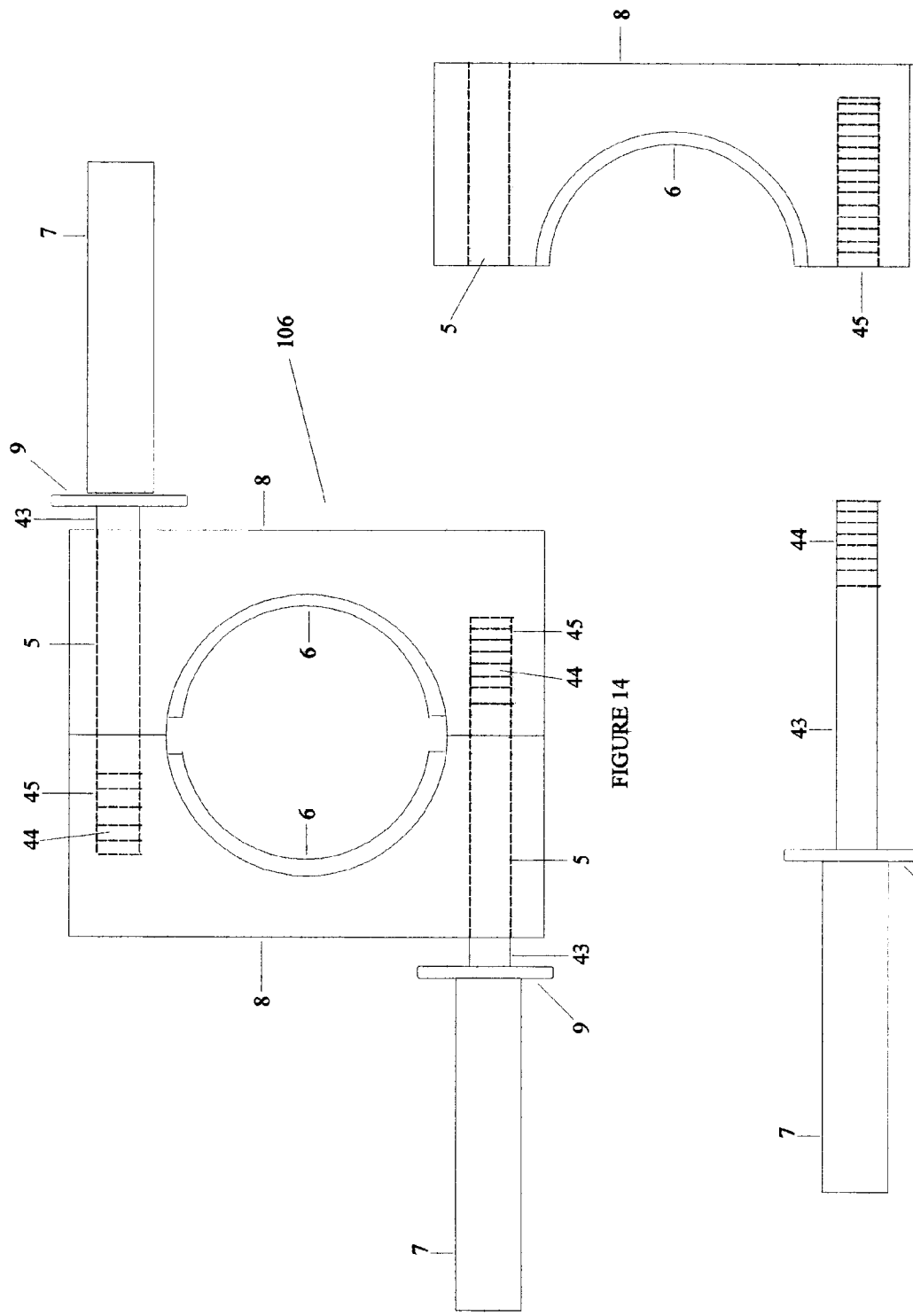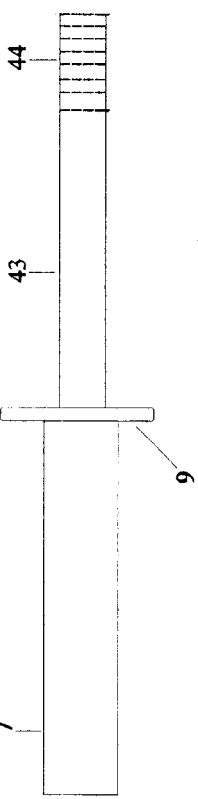

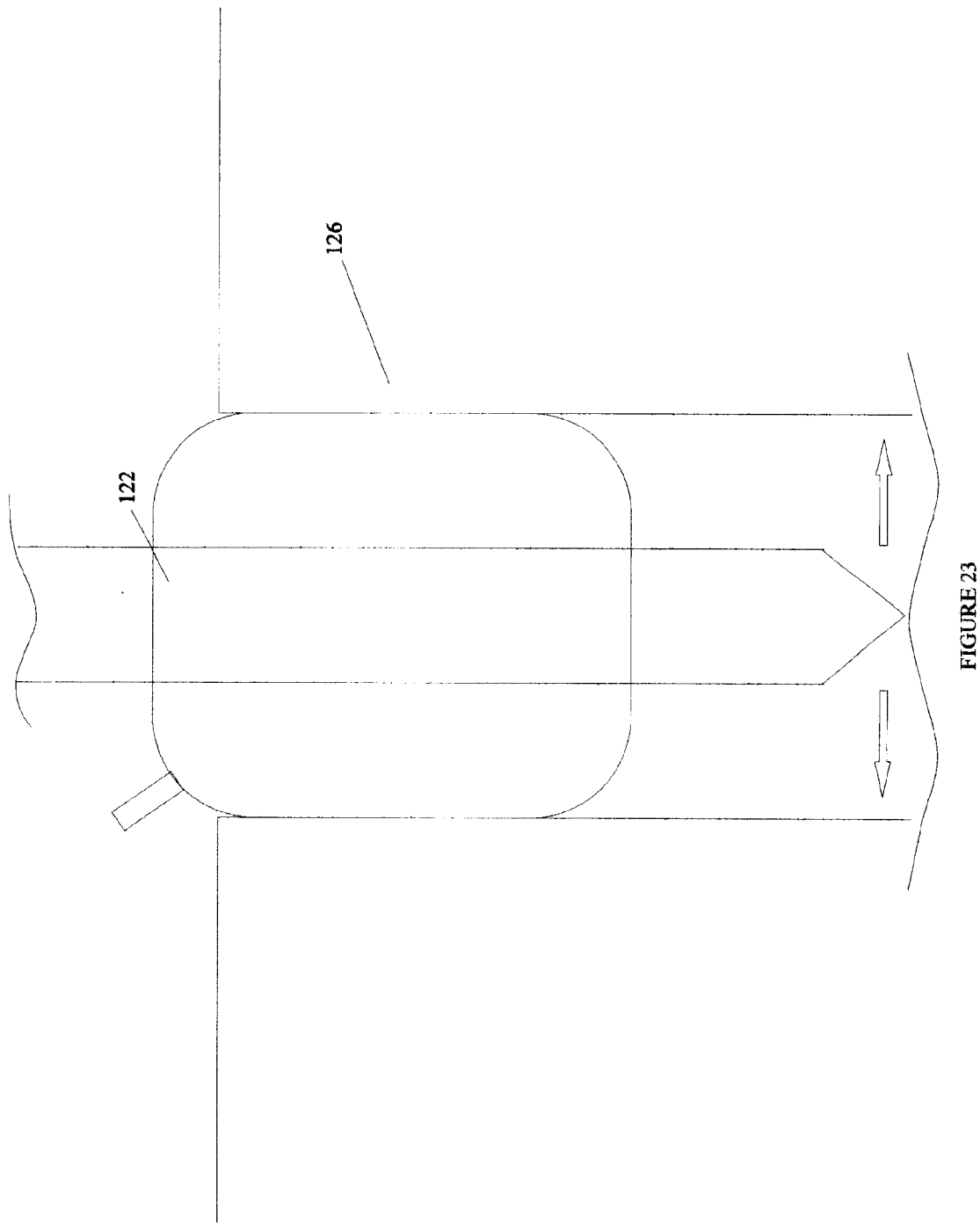

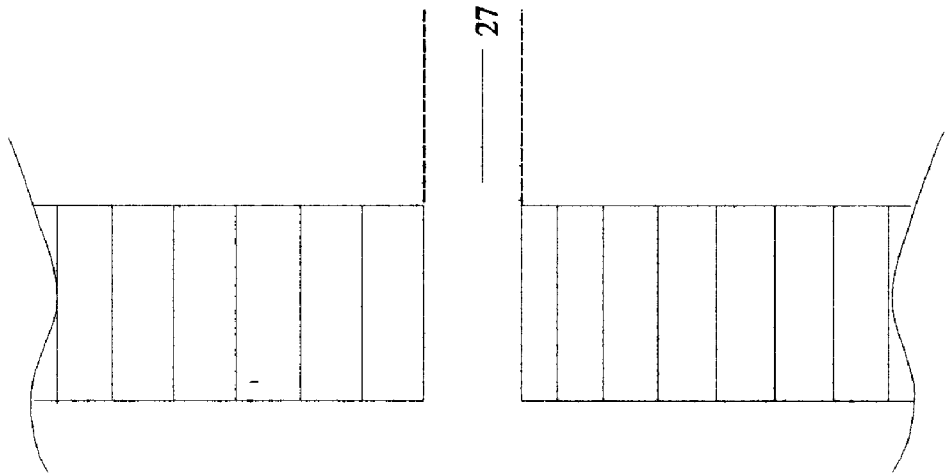
FIGURE 24 - B
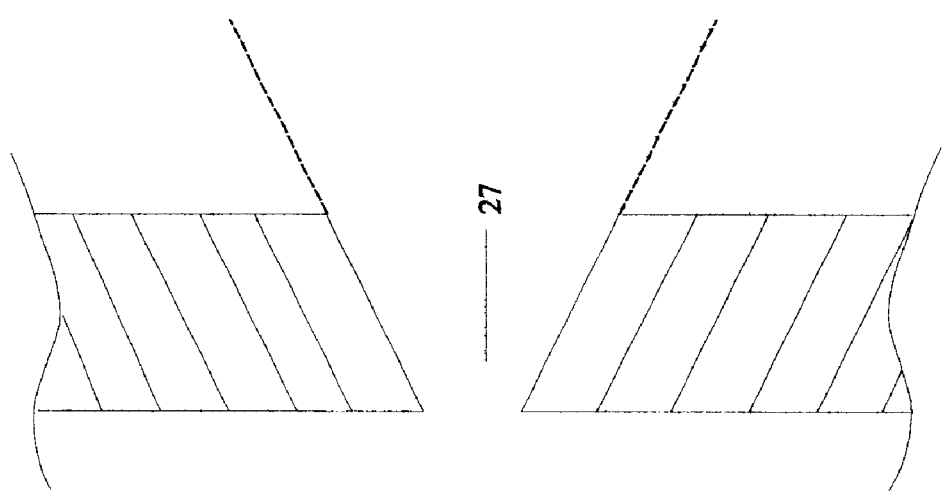
FIGURE 24 - A

ENVIRONMENTAL REMEDIATION SYSTEM AND METHOD

TECHNICAL FIELD

The present invention relates generally to soil and groundwater remediation systems and, more particularly, to an injection system especially useful for insitu treatment of contaminated soil and groundwater.

BACKGROUND ART

As a general rule, remediation technologies may be divided into two major categories comprising of exsitu treatments and insitu treatments. Fundamentally, treatment of waste and contaminated soils and groundwater in an exsitu environment requires the removal of the constituent and the soil and groundwater to a treatment area for the deployment of a technology. This is inherently costly because of the handling and operational costs associated with treatment.

Moreover, there are many technical challenges associated with the existu treatment of contaminated media in areas where contamination is encountered below foundations, roadways, along pipelines and other limited access locations. Combining these challenges with the need to remediate the contaminated area while maintaining production or business operations and the problems associated with existu treatment become significant. Thus, physical removal of contaminated media may be uneconomical and require costly and detrimental closing of business operations in the affected regions. Moreover, removal of the contaminated soils from the site may become financially prohibitive even though damage to the business operations may only be minimal.

Insitu treatment, by contrast, provides for the application of a treatment technology addressing the contaminate in place. Consequently, there is an inherent cost savings to all insitu treatment technologies. Insitu treatment is generally always preferred to a removal and disposal or replacement approach.

Previous attempts to solve some of the aforementioned problems include the following patent:

U.S. Pat. No. 5,868,523, issued Feb. 9, 1999, to Nickell et al., discloses a remediation injection system for insitu remediation of contaminated soil and ground water capable of progressive penetration both vertically and horizontally in contaminated soil and ground water having a soil penetrating lance for injecting air and oxygen and liquid with suspended biologicals into the contaminated soil as the soil penetrating lance is inserted for penetration in the soil, an air compressor for compressing air and delivering the air under pressure to the soil penetrating lance on one end, a liquid pump for pressurizing the liquid and suspended biologicals and delivering the liquid and suspended biologicals under pressure to the soil penetrating lance on one end, a gas connector control for connecting the gas compressor to the lance and for controlling the compressed gas flow, and a liquid connector means for connecting the liquid pump to the lance and controlling the pressurized liquids; and the method of developing a treatment grid both as to the depth of treatment and as to spacing of penetration holes in said contaminated soil, activating a compressed gas source for injection, and activating a pressured water source for injection, driving the soil penetrating lance into the contaminated soil, stopping said lance penetration at levels of penetration for time sufficient to treat the soil, and driving the soil penetrating lance into said contaminated soil to the next stop for treatment until the whole insitu remediation site has been treated.

The present inventors believe the above-described system has many significant problems, shortcomings, and limitations, the solutions to which are discussed hereinafter.

Consequently, there remains a need to provide an improved insitu injection system to treat contaminated media. Those of skill in the art will appreciate the present invention which addresses the above problems, and other significant problems uncovered by the inventors the solutions to which are discussed hereinafter.

SUMMARY OF THE INVENTION

Accordingly, it is an objective of the present invention to provide an improved system and method for treating contaminated media.

An objective of one preferred embodiment of the present invention is to provide an improved injection system with sufficient mechanical integrity to reliably operate at depths up to at least about fifty feet.

An objective of another embodiment of the present invention is to provide means for an operator on the surface to determine and/or remotely control or monitor the progress of treatment below the surface of the media.

An objective of a particular embodiment of the present invention is to provide a system that permits a reaction of chemicals at a downhole location just prior to injection into the media to provide maximum cleaning efficiency.

These and other objectives, features, and advantages of the present invention will become apparent from the drawings, the descriptions given herein, and the appended claims. However, it will be understood that the above-listed objectives of the invention are intended only as an aid in understanding aspects of the invention, and are not intended to limit the invention in any way, and therefore do not form a comprehensive or restrictive list of objectives, and/or features, and/or advantages of the invention.

Accordingly, the present invention provides an injection system for insitu remediation of a contaminated media. The injection system may comprise one or more elements such as, for instance, an injection nozzle for penetrating the contaminated media and dispensing one or more fluids into the contaminated media. Fluids as used herein may include liquids, gases, liquid/gas mixtures, vapors, and/or any flowable medium. The injection nozzle may comprise a nozzle outer sleeve, a plurality of tubulars mounted within the nozzle outer sleeve wherein the plurality of tubulars define a plurality of separate fluid pathways within the nozzle outer sleeve and such that the plurality tubulars may be adjacent each other and may be substantially parallel with respect to each other within the nozzle outer sleeve. Each of the plurality of tubulars may be operable for receiving at least one of the one or more fluids. At least one injector outlet is operable for dispensing the one or more fluids into the contaminated media. The plurality of fluid pathways may be sealed with respect to each and may be interconnected before the injector outlet to provide communication with each other for mixing of the one or more fluids or may not be interconnected within the nozzle to provide mixing of the fluids only after injection into the media.

Thus, the invention may comprise a mixing chamber mounted adjacent to at least one outlet such that the plurality of fluid pathways are in fluid communication with the mixing chamber. The mixing chamber may be operable for mixing one or more fluids prior to dispensing the fluids from the nozzle. The system may further comprise a first pump for pumping a first fluid such that the first pump may be connected to a first of the plurality of tubulars, and a second pump for pumping a second fluid. The second pump may be connected to a second of the plurality of tubulars. The first of the plurality of tubulars and the second of the plurality of tubulars may be operable for keeping the first fluid and the second fluid separate from each other until the first fluid and the second fluid are mixed in the mixing chamber.

In an alternative embodiment, the plurality of fluid pathways are sealed with respect to each other throughout the injection nozzle such that the one or more fluids are mixed after injection into the media adjacent the injector outlet.

Other elements may comprise a connector mechanically interconnecting with and mechanically supporting the plurality of tubulars and the nozzle outer sleeve and/or an injection tip defining therein the injector outlet whereby the connector mechanically interconnects with the injection tip.

In a presently preferred embodiment, the nozzle outer sleeve may define therein a volume which may have no fluid connection to the one or more fluid pumps such that the nozzle outer sleeve remains unpressurized or, more precisely, remains at or near atmospheric pressure.

In other words, the injection system may comprise a plurality of tubulars affixed together for insertion into the contaminated media, at least one injector outlet for dispensing one or more fluids into the contaminated media, and a mixing chamber mounted adjacent to an outlet. The plurality of fluid pathways may be sealed with respect to each until interconnected with the mixing chamber. The mixing chamber may be operable for mixing one or more fluids prior to the dispensing of the one or more fluids into the contaminated media through an injector outlet.

The invention may comprise a plurality of support elements each defining a plurality of apertures therein. Each individual tubular of the plurality of tubulars may be received within a respective of the plurality of apertures such that when the plurality of tubulars are inserted through the plurality of apertures, then the plurality of tubulars are mechanically supported with respect to each other. Each of the plurality of tubulars may comprise at least one rigid tubular and at least one flexible tubular interconnected together such that the plurality of tubulars also comprises a plurality of interconnections between a plurality of rigid tubulars and a plurality of flexible tubulars. In one embodiment, the plurality of interconnections may be axially spaced and/or staggered with respect to each other.

Thus, describing the system differently, the injection system may comprise one or more elements such as, for instance, a plurality of tubulars affixed together for insertion into the contaminated media defining a plurality of separate fluid pathways adjacent each other and substantially parallel with respect to each other; the plurality of tubulars may be operable for receiving at least one of the one or more fluids and each of the plurality of tubulars may comprise at least one rigid tubular and at least one flexible tubular interconnected together such that the plurality of tubulars comprises a plurality of interconnections between a plurality of rigid tubulars and a plurality of flexible tubulars.

The invention may comprise a plurality of injection outlets such that respective of the plurality of tubulars are connected to respective of the plurality of injection outlets whereby the one or more fluids within the plurality of tubulars are unmixed until after the plurality of injection outlets dispense the one or more fluids into the contaminated media.

A remote control may be provided in a preferred embodiment that may connect to system components either wirelessly and/or using electrical cables. The remote control may perform one or more functions such as, for instance, shutting off selected pumps or the entire system. Other remote control features may include on-off controls for any system components, fluid flow controls to control flow rates, pressure, fluid ratios when different fluids are pumped, sequencing of pumps and valves for sequenced delivery of different fluids, control of which fluids flow through which pipes, power, and the like. The remote control may also be utilized to monitor various equipment and sensors such as down hole pH, temperature, depth, quantity of fluids delivered, and so forth. There may be one or more remote controls which may be interconnected and which may also provide communication between different system operators.

The invention also provides a plurality of methods. In one embodiment, a method for insitu remediation of a media may comprise one or more method steps such as, for example only, supporting one or more tubulars within an interior of a nozzle outer sleeve, inserting the nozzle outer sleeve and the one or more tubulars into the media, pumping one or more fluids through one or more tubulars, and providing that the interior of the nozzle outer sleeve remains substantially at atmospheric pressure at all times during the insitu remediation of the media.

Other steps may comprise mounting a plurality of tubulars parallel with respect to each other within the nozzle outer sleeve and/or providing an electronic communication path through the interior of the nozzle outer sleeve, producing sensor data by electronically sensing one or more physical phenomena, and communicating the sensor data through the electronic communication path.

As another example, the invention may comprise mounting a plurality of tubulars parallel with respect to each other, inserting the plurality of tubulars into the media, pumping one or more fluids through one or more tubulars such that the one or more tubulars keep the one or more fluids segregated with respect to each other within the one or more tubulars until just before or just after injecting the one or more fluids, and providing that the interior of the nozzle outer sleeve remains substantially at atmospheric pressure at all times during the insitu remediation of the media. In one preferred embodiment, the method may comprise mounting a plurality of tubulars parallel with respect to each other within the nozzle outer sleeve.

In another embodiment, the method may further comprise pumping a plurality of different fluids through the one or more tubulars such that the one or more tubulars keep the plurality of different fluids segregated with respect to each other within the one or more tubulars until just before or just after injecting the plurality of fluids into the media. In one case, the method may comprise mixing the plurality of different fluids in a mixing chamber just before injecting the plurality of fluids into the media.

In one embodiment, the method may comprise electronically or mechanically controlling a fluid flow ratio of the plurality of different fluids with respect to each other.

Stated differently, the method may comprise mounting a plurality of rigid tubulars parallel with respect to each other, connecting a plurality of flexible tubulars to the plurality of rigid tubulars, and inserting the plurality of rigid tubulars and the plurality of flexible tubulars into the media.

Other method steps may comprise mounting a first outer sleeve in surrounding relationship to the plurality of rigid tubulars prior to the step of inserting and/or connecting a second outer sleeve to the first outer sleeve and/or pumping one or more fluids through the plurality of rigid tubulars and the plurality of flexible tubulars and/or remotely controlling one or more pumps for pumping the one or more fluids.

In one embodiment, the method may comprise segregating a plurality of different fluids with respect to each other within the plurality of tubulars until just before or just after injecting the plurality of fluids into the media, and/or mixing the plurality of different fluids in a mixing chamber just before injecting the plurality of fluids into the media.

In one embodiment, the method may comprise sealing between the first outer sleeve and the media to prevent fluid flow out of the media. In another embodiment, the method may comprise producing a vacuum outside of the first outer sleeve for removing excess of the one or more fluids from the media.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein:

FIG. 2 is an elevational view, partially in phantom lines, showing interconnections for one possible embodiment of an injection tip which may be utilized with the system of FIG. 1;

FIG. 3 is an elevational view, partially in phantom lines, of a disassembled view of components shown in FIG. 2;

FIG. 4 is an elevational view of one possible embodiment for a lower end of a nozzle outer sleeve operable for interconnecting to the injection tip of FIG. 2;

FIG. 5 is an elevational view, partially in phantom lines, of a presently preferred embodiment adapter for interconnecting the injection tip, nozzle outer sleeve, and rigid high pressure tubes;

FIG. 6 is an elevational plan view of the adapter of FIG. 5;

FIG. 14 is an elevational plan view, partially in phantom lines, of a quick release handle in accord with the present invention.

FIG. 15 is an elevational view of a threaded handle grip of the quick release handle of FIG. 14;

FIG. 16 is an elevational view, partially in phantom lines, of a compression body of the quick release handle of FIG. 14;

FIG. 23 is an elevational diagrammatic for an inflatable packer that may be used with an injection nozzle of the present invention.

FIG. 24A is an elevational view, in cross-section, showing an injector port with an expanding aperture for wider angular range of discharge of cleaning fluids into a contaminated media;

FIG. 24B is an elevational view, in cross-section, showing an injector port with a constant sized aperture for a more limited angular range of discharge of cleaning fluids into a contaminated media.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

Figure 1:
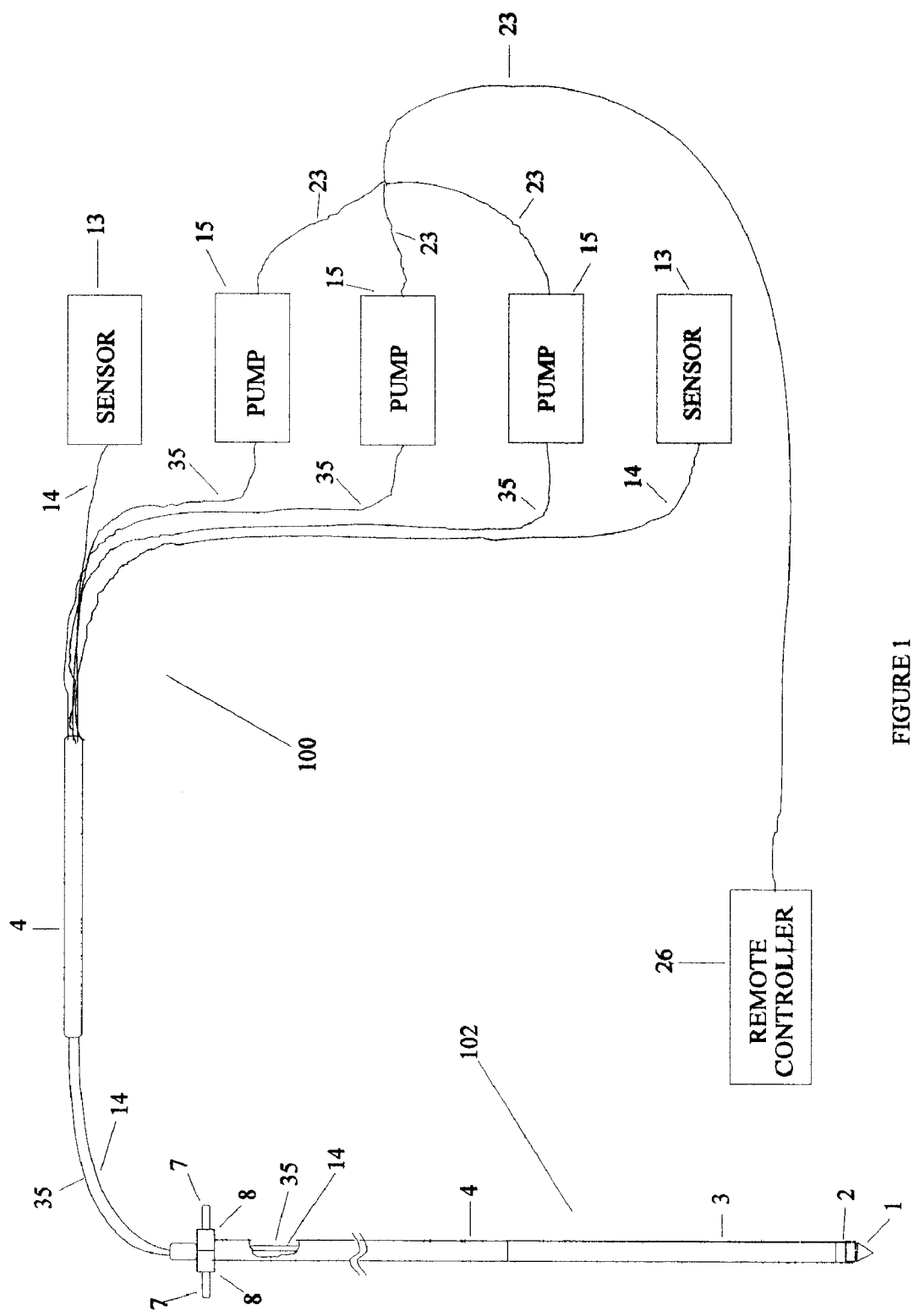
FIG. 1 is an elevational and block diagrammatic plan view, partially cut away, disclosing an overview of an injection system in accord with the present invention.

Now referring to the drawings, and more particularly to FIG. 1, there is shown an injection system 100 in accord with the present invention. For remediation purposes, injection nozzle 102 is lowered into a hole in the medium and used to inject fluid to thereby remediate any contaminated medium.

In a preferred embodiment, injection tip 1 is connected to tubular bushing adapter 2 which is then connected to the nozzle outer sleeve 3. Extension outer sleeve 4 is attached to nozzle outer sleeve 3. While outer sleeve 3 is preferably a rigid tubular element such as a metallic tubular of sufficient wall thickness to provide strength to the lower portion of injection nozzle 102, extension outer sleeve 4 may be a rigid or pliable tubular. Additional outer sleeves 4 may be interconnected as necessary to provide the desired length for injection nozzle 102. In a presently preferred embodiment, outer sleeves 3 and 4 are not intended to be pressurized, e.g., not connected to a pump, and therefore do not require seals, such as elastomeric seals, metal-to-metal seals, or any other type of seals, at the various connections making construction simpler. Instead, a basic function of outer sleeves 3 and 4 is to provide mechanical integrity for protection of injection nozzle 102 and a housing for flexible tubes, sensor wires, sensors, and other components discussed hereinafter. However, if desired, it would be possible to add seals such as O-rings, gaskets, mechanical seals, and the like, between outer sleeves 3 and 4. One or more extra extension sleeve(s) 4 may stand ready to be attached for lowering injection nozzle 102 to the desired depth. Alternatively, pliable tubulars or coiled tubing, which may be metallic, may be utilized in a single piece extension sleeve 4 to provide the desired length of system. In fact, if a coiled tubing unit (not shown) is utilized, then the coil of tubing may be manually or automatically unrolled by machine into the bore in the medium to be treated for remediation. The entire coil may be mounted on a platform with wheels or treads (not shown) so as to be moveable over the surface of the medium to be remediated. If individual tubulars are utilized for extension sleeve(s) 4, then quick release handle may be utilized to manually control lowering and raising of injection nozzle 102.

To avoid injection nozzle leakage, which has been a problem in prior art injection nozzles, nozzle outer sleeves, such as nozzle outer sleeve 3 and extension outer sleeve(s) 4 or any pliable outer sleeve(s) 4, are preferably not pressurized, as discussed above, and basically serve the purpose of providing mechanical strength and support for the one or more high pressure conduits contained therein which are discussed hereinafter. Pliable and/or rigid outer sleeve extension tubulars utilized to extend the length of the nozzle for deeper operation into the media, may or may not be the same diameter as the rigid outer sleeve 3. For instance, outer sleeve 4 may be pliable and/or continuous and may be utilized in place of or in addition to rigid outer sleeves. Sleeves 3 and 4 may be flexible, stainless steel, non-conductive material, rigid, plastic, or of any other desired construction.

FIG. 1 includes a cutaway portion of the extension outer sleeve 4 which shows therein sensor wires 14 and one or more preferably flexible high pressure hoses, such as high pressure hose 35. One or more sensor wires or groups of wires 14 may also extend into injection nozzle 102. Sensor wire(s) 14 may, for instance, be connected to sensor instrumentation 13. Features and advantages of sensors for use with injection nozzle 102 are discussed subsequently.

Manual control handle 106 may be utilized for quickly gripping/releasing injection nozzle 102 at any axial position along injection nozzle 102. Manual control handle 106 may be used for conveniently guiding, pushing, rotating, and lifting injection nozzle 102. In a presently preferred embodiment, manual control handle 106 comprises quick release handle main body 8 with handle grips 7 that are illustrated as grippingly engaging extension outer sleeve 4.

Flexible high pressure hoses 35, such as flexible high pressure hoses 35 are attached to corresponding injection pumps 15. Remote control 26 may be utilized for any desired remote control purposes including remote/automatic shut-off, emergency shut-off, motor control, valve(s) operation, monitoring/responding to sensors 13, controlling pump flow rates, adjusting ratios of injected fluids, monitoring down hole reaction temperatures, pH, sequencing delivery of fluids, and/or for any other control purposes. One or more cables, such as cable 23 and/or branches therefrom, may be utilized to electrically connect to one or more pumps and sensors such as, for instance, pumps 15 and/or sensors 13. Remote control 26 might also comprise a wireless connection such as a transceiver to avoid the need for cables, such as cable 23.

FIG. 2 discloses details for one embodiment of injection tip 1. One or more injection ports 27 may be provided on injection tip 1 in any desired pattern. Depending on the flare of the cross-section of each injection port 27, as shown in FIGS. 24A and 24B, the injection ports 27 may direct fluid therefrom in a presently preferred range from about 0 degrees, as shown in FIG. 24B, to 135 degrees, as shown in FIG. 24A. The aperture may be placed on the angled portion of injection tip 1 to point downwardly or substantially downwardly. However, the port could be oriented to point upwardly or directly to the side. A different number or perhaps all injection ports 27 may be placed on one side or over one area of injection tip 1 or other parts of the injection nozzle to produce a spray directed toward any selected part of the hole. Different injection tips may be utilized with different injection ports for conveniently and quickly changing the orientation of fluid delivery. Different fluids may have different spray patterns than other fluids, if desired. Thus, the number, flare, and placement of injection ports 27 may be varied as desired to produce any desired fluid delivery pattern.

In one presently preferred embodiment, mixing chamber 108 is provided for mixing fluids just prior to injection into the medium. In some cases of operation of the present invention, it is desirable that different remedial fluids (which may include liquids, gases, vapors, mixtures, gas-liquid mixtures, powders, and any flowable medium) are mixed or reacted just prior to injection for maximum effect and otherwise remain separate. The present invention provides this capability by permitting different remedial fluids to remain sealed and separated from each other until reaching mixing chamber 108 where they can be reacted together. In this particular embodiment, the upper end of injection tip 1 contains a hollow cavity used as mixing chamber 108 to allow the internal mixing of reagents before they are forced out through the injection ports. However, mixing chamber 108 could be positioned elsewhere in injection nozzle 102 as desired, such as within injection tip 1 or in another section of injection nozzle 102. Therefore, one possible embodiment of the present invention provides for the possibility of injecting a plurality of different remedial fluids simultaneously such that they remain segregated until mixing in mixing chamber 108 just prior to injection. However, mixing chamber 108 could also be provided on the surface, near the pumps, within the hoses, or at any desired location in the system.

Figure 25:
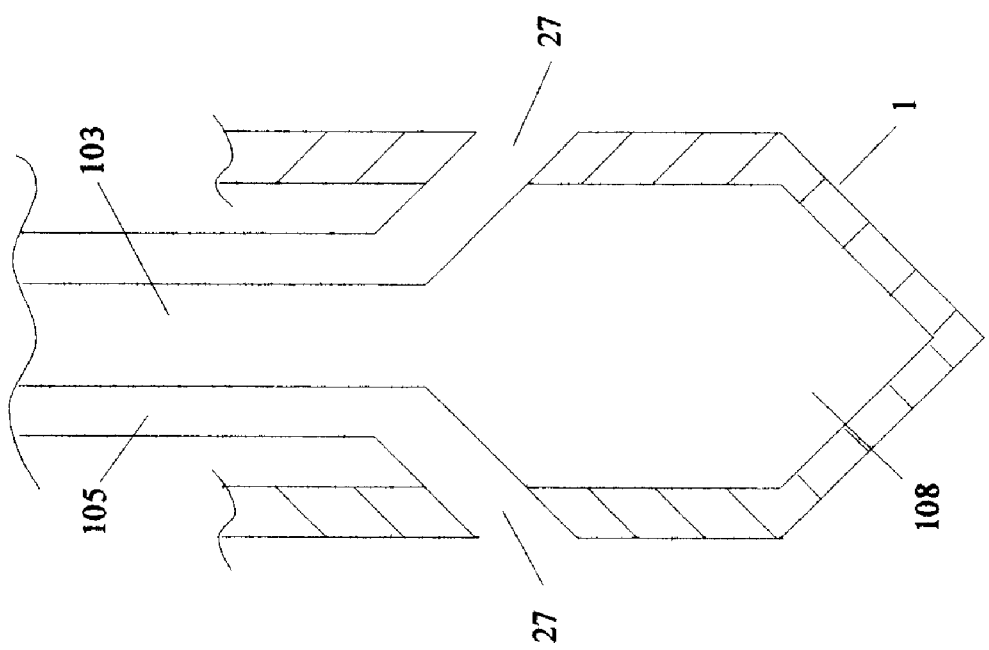
FIG. 25 is an elevational view, in cross-section, showing an injection tip for dispensing different chemicals into the formation prior to mixing.

In another embodiment, injection tip 1 may be designed such that the remedial fluids remain unmixed before injection as indicated by FIG. 25 which shows two different fluid flow paths 103 and 105 that remain unmixed until after injection into the media through injection ports 27. In yet another embodiment, some fluids may be injected before mixing and others may be mixed prior to injection by including mixing chamber 108 in this design. Thus, the present invention contemplates handling a plurality of remedial fluids in any desired mixing or segregated arrangement.

Injection tip 1 may be constructed in many different ways to provide sturdy construction that supports the injection tubes, discussed hereinafter. In a presently preferred embodiment, injection tip 1 has a female threaded end 31 to allow connection to the tubular bushing adapter 2 with male threaded end 28. However, it would generally be possible to reverse the male/female thread arrangements with respect to the components discussed herein. Moreover, other types of connections, including O-ring seals, high temp, non-reactive seals as may utilize Teflon and so forth may be utilized. Different interconnection techniques such as collars, latches, locks, and the like may also be utilized. Thus, there may be many variations of this tip design.

Additional features of injection tip 1 may include debris removal or cutting attachments such as teeth 110, and the like. For instance, in one embodiment, a lower end of tip 1 with cutting attachments may be rotatable and be driven by a down hole motor (not shown), such as a fluid operated motor or electrically operated motor, for cleaning the hole in the medium and, if necessary deepening the hole.

In one preferred embodiment, tubular bushing adapter 2 serves the purpose of providing a stable and centralized secure connection device to one or more rigid high pressure tubes 29, to the injection tip 1, and also to nozzle outer sleeve 3. However, other interconnection mechanical elements could also be utilized. Tubular bushing 2 as shown more clearly in FIG. 5 may include pass through holes 33 with connection means such as female threads defined therein for interconnecting with rigid high pressure tubes 29. Threads, or other mechanical connection means, may be provided on tubular bushing 2 to facilitate the connection therewith to the rigid high pressure tubes 29 or, if desired, to flexible tubes as discussed hereinbefore. In one embodiment, pass through holes 33 may comprise female threads so that high pressure tubes 29 then have male threads 30 (See FIG. 2) although other threaded connections could be utilized and/or other types of mechanical connections could be utilized.

If one or more tubes are not utilized in any particular operation, then the corresponding pass through holes 33 may be blocked off with a suitable plug. O-ring seals or other types of seals may be utilized as desired. In some cases, pass through holes 33 or other portions of the fluid flow path may be provided with a selected size orifice, a selectable position valve, flow meter sensor, pressure sensor, or other fluid control means to control fluid flow, fluid pressures, and the like, as desired.

Rigid high pressure tubes 29 may be threadably connected to tubular bushing adapter 2 and thereby conduct flow of liquids at high pressure to the injection tip 1 for ultimate release through injection ports 27. Although FIG. 6 (top view of tubular bushing adapter 2) shows three threaded holes 33, the number of threaded holes 33 can be more or less depending upon project specifics. Rigid high pressure tubes 29 are mounted so as be substantially parallel with each other. In this embodiment, the tubulars have the same diameter, but if desired, some tubulars may be larger and/or smaller.

Tubular bushing adapter 2 may have threads 28 on each end of thereof. As stated earlier, the injection tip 1 may comprise female threaded end 31 which is threaded to one end of the tubular bushing adapter 2 which may comprise mating male threads. Nozzle outer sleeve 3 may or may not have a female threaded end 32 as shown in FIG. 4, which connects to the other end of the tubular bushing adapter 2 via correspondingly threaded end 28.

Outer nozzle sleeve 3 slides over the rigid high pressure tubes 29, which may be one or more high pressure tubes, and provides a protective housing for rigid high pressure tubes 29 and overall rigidity to the injection nozzle 102. Rigid high pressure tubes 29 and nozzle outer sleeve 3 can be of varying lengths and numbers depending upon application. It is highly desirable that the injection nozzle 102 in accord with the present invention provide a strong and stable structure in order to prevent twisting, bending, breaking, and leaking. FIG. 3 shows the components of FIG. 2 unconnected and spaced apart for easier viewing.

Figure 8:
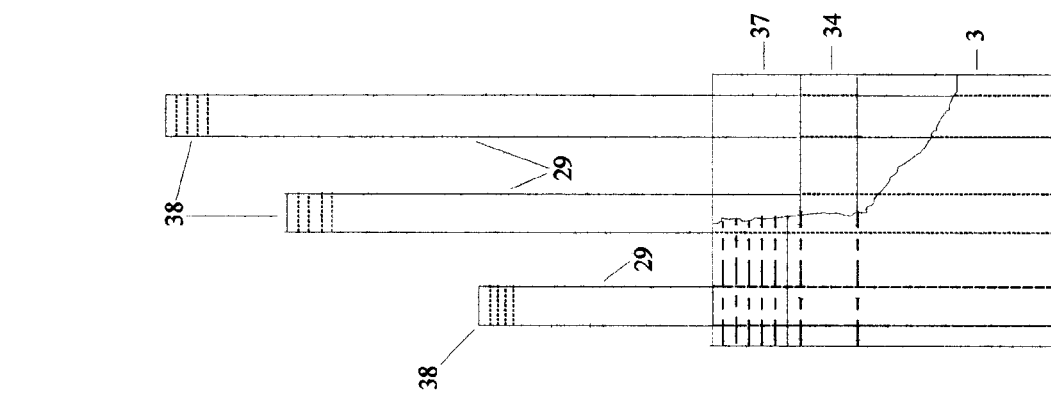
FIG. 8 is an elevational view, partially in phantom lines and partially cut away, showing the upper end of the nozzle outer sleeve of FIG. 7.
Figure 7:
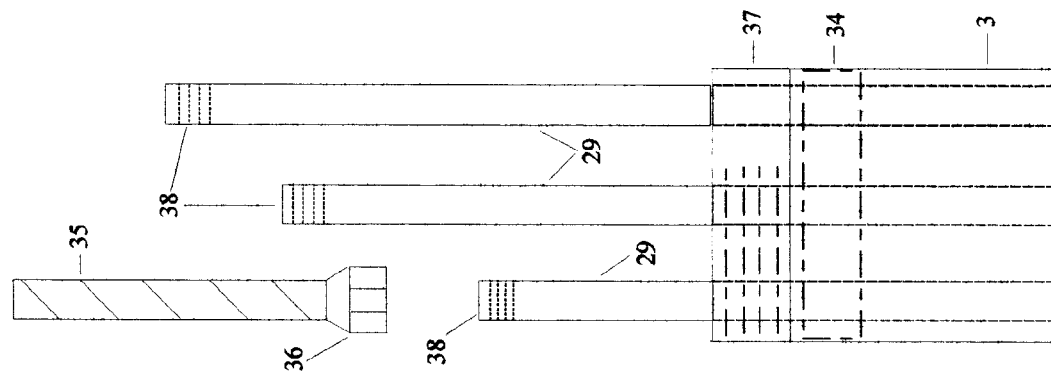
FIG. 7 is an elevational view, partially in phantom lines, showing interconnections between rigid high pressure tubes and flexible high pressure tubes at an upper end of the nozzle outer sleeve in accord with a presently preferred embodiment of the invention.

FIG. 7 and FIG. 8 show an upper end of nozzle outer sleeve 3 which may connect to a first of one or more extension outer sleeves 4. Nozzle outer sleeve 3 may have a threaded end 37, which may or may not comprise male threads. At the connection of outer sleeve 3 and outer sleeve 4, or preferably adjacent thereto, connections 36 are made between rigid high pressure tubes 29 and flexible high pressure tubes 35. In this embodiment, rigid high pressure tubes 29 protrude out of nozzle outer sleeve 3 but the interconnection might also be made inside of nozzle outer sleeve 3. FIG. 7 and FIG. 8 show three rigid high pressure tubes 29 but the number of rigid high pressure tubes can be increased or decreased as desired depending upon circumstances.

In a presently preferred embodiment, one or more flexible high pressure hoses 35 with a male or female swivel nut 36 may be threadably attached to form a tight seal with a corresponding rigid high pressure tubes 29 utilizing swivel nut 36 by threading onto the male threaded ends 38. The differing or staggered lengths allow a plurality of swivel nut connections between the rigid high pressure tubes 29 and the flexible high pressure hoses 35 without interference between swivel nuts 36. Moreover, the lengths and/or diameters of the rigid high pressure tubes 29 and/or flexible tubes may be different.

Figure 9:
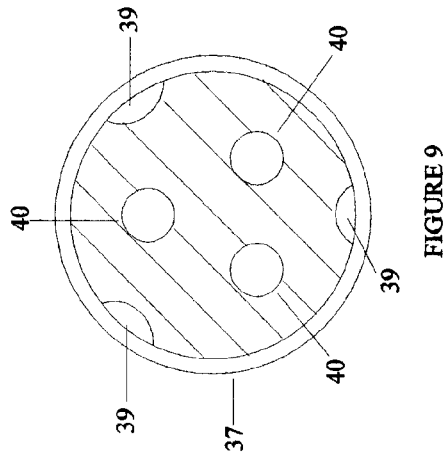
FIG. 9 is an elevational plan view, partially in section, showing an internal spacer in accord with a preferred embodiment of the present invention.
Figure 10:
FIG. 10 is an elevational view showing an internal spacer such as the internal spacer of FIG. 9.

FIG. 7 and FIG. 8 also show an internal spacer 34 inserted inside the nozzle outer sleeve 3. A side view of internal spacer 34 is shown in FIG. 10 and a cross-sectional view from the top or bottom of internal spacer 34 is shown in FIG. 9. One or a plurality of internal spacers 34 may be utilized within nozzle outer sleeve 3. Internal spacers may also be utilized, if desired, in each nozzle outer sleeve 4 or with any flexible outer sleeves utilized. Internal spacer 34 is secured inside nozzle outer sleeve 3 and/or outer sleeve 4 by any suitable means such as friction, screws, pins, shoulders, and the like. Thus, one or more internal spacers 34 support rigid high pressure tubes 29 and/or flexible high pressure tubes 35 along with the connections between tubular bushing adapter 2 and the nozzle outer sleeve 3. The purpose of internal spacers 34 are to provide constant spacing of the rigid high pressure tubes 29 with respect to each other and stability to the overall nozzle system 100. This construction prevents twisting or torquing of the rigid high pressure tubes 29 when the extension outer sleeve 4 is rotated during assembly and/or during operation when injection nozzle 102 is advanced into the subsurface during injection operations as has been problematic in prior art injection tools. Internal spacers 34 may be inserted midway into nozzle outer sleeve 3, if desired, to provide constant spacing between rigid high pressure tubes 29 and to provide overall stability of injection nozzle 102. Internal spacers 34 may also be placed inside the extension outer sleeve 4, which may be flexible or rigid, may thereby provide constant spacing and stability of flexible high pressure hoses 35.

Figure 11:
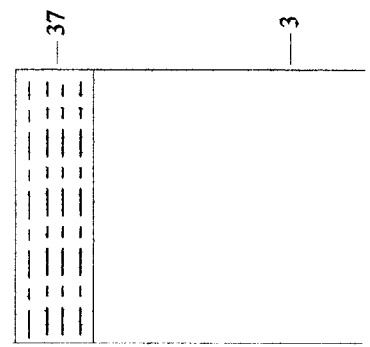
FIG. 11 is an elevational view showing the upper end of the nozzle outer sleeve such as that in FIG. 7.

FIG. 9 shows a cross-sectional top or bottom view of internal spacer 34 in position within outer nozzle sleeve 3. Rigid high pressure tubes 29 slide through the pass through holes 40. Half-moon cutouts 39 may be provided at the edge of the internal spacer 34 to allow sensor wires, such as wires or groups of wires 14 to extend from the injection unit which may comprise sensor instruments 13 to sensors that may be positioned anywhere in injection nozzle 102. For instance, sensor mounts 112, shown in FIG. 2, may be utilized for sensing any physical conditions that exist outside nozzle tip 1. Sensors could be positioned anywhere along the tool or wherever desired including outside the tool, in the field being remediated, in any equipment, or anywhere desired. Sensor 116, shown in FIG. 3, may be used to sense conditions within mixing chamber 108. Internal sensors may be utilized to sense injection nozzle conditions such as pH, temperature, resistivity, conductivity, salinity, fluid flow rates, pressure, acceleration, and the like. Sensors may be utilized with one or more pumps to control and sense flow rates, valve positions, and mixture ratios. For instance, if three fluids are pumped, then sensors may be utilized to maintain the mixture ratio, e.g., 3:1:2 of the three fluids. Feedback may be used to control pump rates to maintain the mixture ratios. Various types of depth sensors could be utilized to ascertain and/or log the depth of injection with respect to the amount of fluid pumped thereby permitting real time analysis of progress of an operation. Temperature may be utilized when fluids may induce chemical reactions whereby temperature can be an indication of the progress of the operation. Thus, sensors can be utilized to more efficiently manage a project utilizing minimum amounts of remediation fluids and improving speed of operation. FIG. 11 shows the upper end of the nozzle outer sleeve 3 and also illustrates the male threaded end 37.

Figure 13:
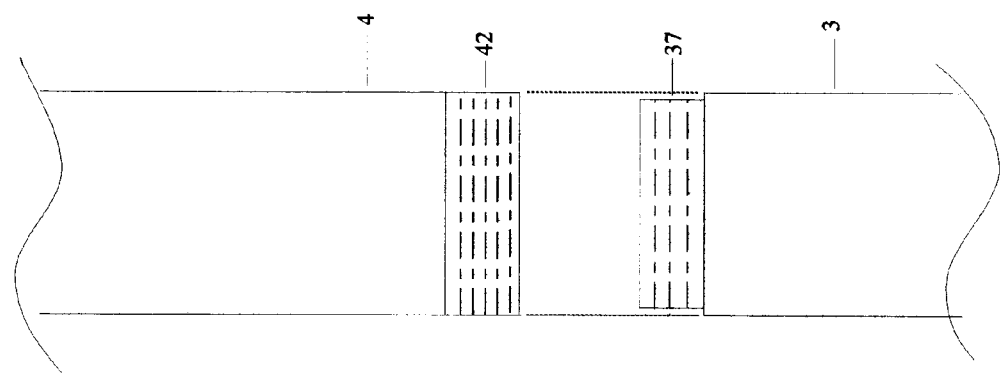
FIG. 13 is an elevational side, partially in phantom lines, showing interconnections of the nozzle outer sleeve and an extension outer sleeve in accord with one embodiment of the present invention.
Figure 12:
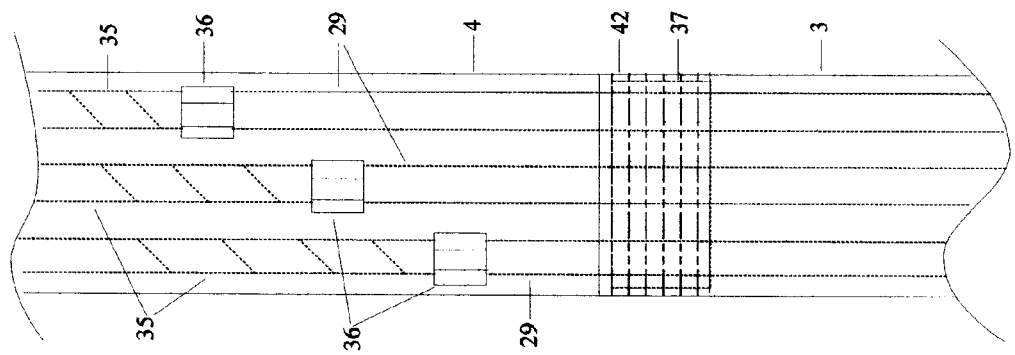
FIG. 12 is an elevational view, partially in phantom lines, showing spaced interconnections between rigid high pressure lines and flexible high pressure lines within a nozzle in accord with a presently preferred embodiment of the present invention.
Figure 18:
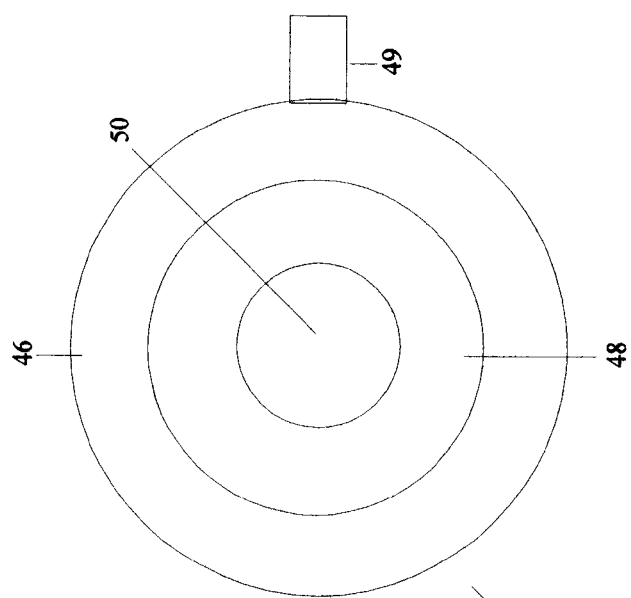
FIG. 18 is an elevational plan view of the vacuum device of FIG. 17.
Figure 19:
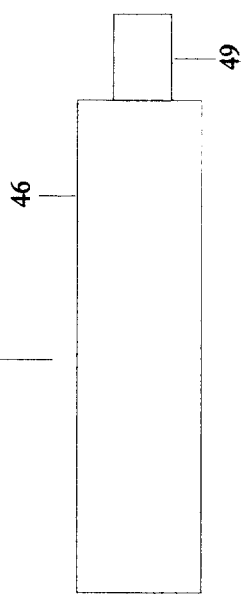
FIG. 19 is an elevational view of the vacuum device of FIG. 17.
Figure 17:
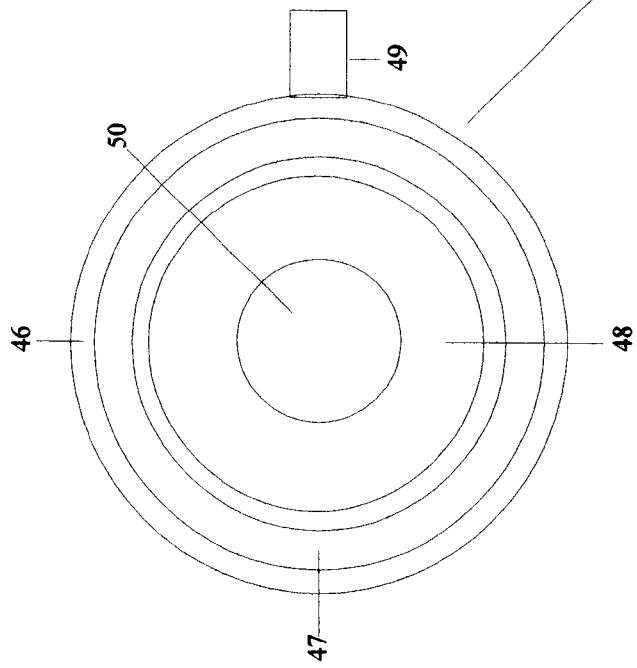
FIG. 17 is an elevational bottom view of one possible construction for the vacuum device of FIG. 22 in accord with one embodiment present invention.

FIGS. 12 and 13 show the nozzle outer sleeve 3 with male threaded end 37 connected to the nozzle outer sleeve 4 with female threaded end 42. Also shown are the rigid high pressure tubes 29 threadably connected to the flexible high pressure hoses 35 with via corresponding swivel nuts 36. The connection of the rigid high pressure tubes 29 to the flexible high pressure hoses 35 may be made above or below the union of outer nozzle sleeve 3 and extension outer sleeve 4. The swivel nut connections may preferably be staggered in length if necessary to prevent the swivel nut connections from interfering with each other due to space constraints. If desired, other types of high pressure tubular interconnections may be utilized other than swivel nut connections as are known to those of skill in connecting high pressure tubulars.

FIG. 14, FIG. 15, and FIG. 16 disclose a presently preferred manual control handle 106, that may be utilized with a manually lifted/lowered embodiment of the present invention that provides for quickly releasing and securely gripping any extension outer sleeve 4 and/or outer nozzle sleeve 3. Manual control handle 106 comprises main body 8, in two preferably duplicate sections, which may be squared off or otherwise shaped on an outer surface and contain a recessed semicircular gripping surface 6 on an inner surface thereof of a size suitable for mating to a cylindrical surface of extension outer sleeve 4 and/or outer nozzle sleeve 3. Circular gripping surface 6 may comprise a rubber grip liner mounted to a corresponding outline in body 8 for the purposes of providing a secure grip when clamped around the nozzle outer sleeve 3 or extension outer sleeve 4. The rubber liner 6 can be affixed to the main body 8 with an adhesive material, recessed screws, or by any other attachment means. Body 8 may comprise any suitable high strength material such as metal, plastic, alloys, aluminum, and so forth.

Main body 8 may contain an internal female threaded cavity 45 on one end of the semicircle side of main body 8 and a pass through aperture 5 on the other end of the semicircle side of main body 8 as illustrated most clearly in FIG. 16. In operation, the two (2) main bodies 8 are situated with the semicircle sides facing each other, a female threaded cavity 45 of one facing a pass through hole 5 of the other for the purpose of compression. A rotatable quick release handle to apply compression to main bodies 8 for grippingly engaging injection nozzle 102 is best shown in FIG. 15. The handle comprises a handle shaft 43 with a male threaded end 44 and a handle compression collar 9 with a handle grip 7. The handle shaft 43 with male threaded end 44 is inserted through the pass through holes 5 and screwed into the female threaded cavity 45. The handle grip 7 provides a grip to turn the quick release handle mechanism and the compression collar 9 provides a physical means of compressing the main bodies 8 against each other when the quick release handle mechanism is tightened. The rotatable quick release handles generally require only a portion of a turn to either quickly release or securely grip a tubular surface. Quick release handle device 106 allows the advancement and retrieval of the nozzle injection assembly by a simple twisting and turning technique. Rubber liner grip 6 provides a secure fit to allow advancement and retrieval while not damaging the outer sleeves. The design of quick release handle device 106 allows the device to slide up and down the outer sleeve upon advancement or retrieval without physically removing it thus providing fast and efficient advancement and retrieval.

Other types of handles could also be utilized, e.g., straps, friction gripping devices, straps with quick locks, and the like. Moreover, if desired, the outer sleeves may be slotted to accept mating handles. If an automatic arrangement for lowering an injection nozzle is utilized, such as a spool (not shown) with flexible tubing mounting thereon, then a manual gripping handle may not be utilized at all.

Figure 22:
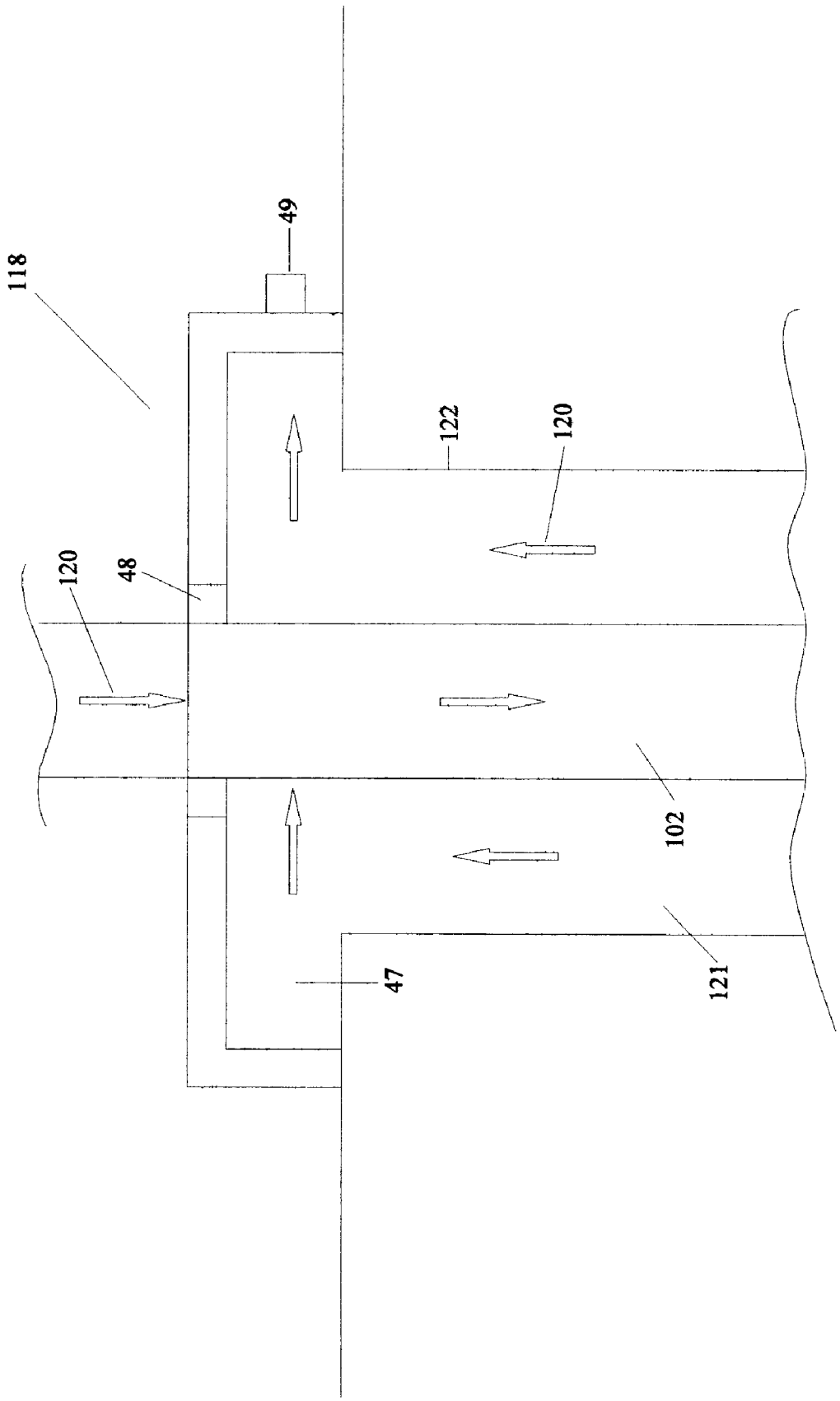
FIG. 22 is an elevational diagrammatic for a vacuum device that may be used with an injection nozzle of the present invention.

FIG. 17, FIG. 18, FIG. 19, and FIG. 22 illustrate return fluid capture device 118 that may be used, if desired, in conjunction with injection nozzle 102. FIG. 22 shows the general operation of return fluid capture device 118. Fluid is pumped into injection nozzle 102 in a downward direction as indicated by fluid flow arrows 120 and then flows upwardly through annulus 121. The fluid is injected into the formation at some point along injection nozzle 102. Any fluid not flowing into the media, then flows back up annulus 121 formed between injection nozzle and hole 122. The hole into which injection nozzle 102 is inserted may be slightly larger than the diameter of injection nozzle 102 or may be substantially larger than the diameter of injection nozzle 102 depending on the type of operation, such as the type of media and the media's absorption characteristics. It may be desirable to recapture fluid which might otherwise return out of hole 122 onto the surface of the media. Return fluid capture device 118 seals off the top of hole 122 and conducts fluid. A vacuum assist may be utilized to enhance return fluid flow such as by creating a vacuum through one or more fittings 49 as indicated by fluid flow arrow 120. Although a vacuum may be utilized in a preferred embodiment, the pressure of the fluid may be sufficient in itself to simply provide a conduit attached to fitting 49 without the need for applying a vacuum. In this case, fitting 49 may simply comprise a pipe to a fluid storage unit.

In a presently preferred embodiment, capture device 118 may comprise any suitable material such as plastic or metal shell casing 46 with hollowed out vacuum chamber 47 on the underside. A hose fitting 49 is attached to the side of the metal casing 46 and allows passage to the vacuum chamber 47. An expandable and/or inflatable and/or compressible and/or flexible seal 48 with a center pass through hole 50 may be affixed to center of the metal casing with an adhesive material, screws, or other means.

Thus, the purpose of fluid capture device 118 is to allow the evacuation of liquids and slurry materials that extrude from the injection hole. A vacuum device with suction hose may be attached to the hose fitting 49. The metal shell casing 46 is place over the hole with the vacuum chamber 47 against the ground surface. The nozzle injection system, which may include extensions 4 and/or other tubulars or variations of a nozzle injector, slides through the center pass though hole 50 of the expandable seal 48.

When a vacuum is applied, the underside of the metal shell casing 46 will provide and/or enhance the seal to the ground, along with the force created by the weight of fluid capture device and/or any ballast added thereto, and the expandable seal 48 will provide a seal around the nozzle outer sleeve 3 or the extension outer sleeve 4 upon advancement and retrieval. Collection/vacuum chamber 47 rests over the open injection hole to vacuum liquids and slurries upon operation. The captured liquids and slurries may be captured in a drum, tank or other suitable device thereby preventing onsite and offsite migration of extruded materials.

Figure 20:
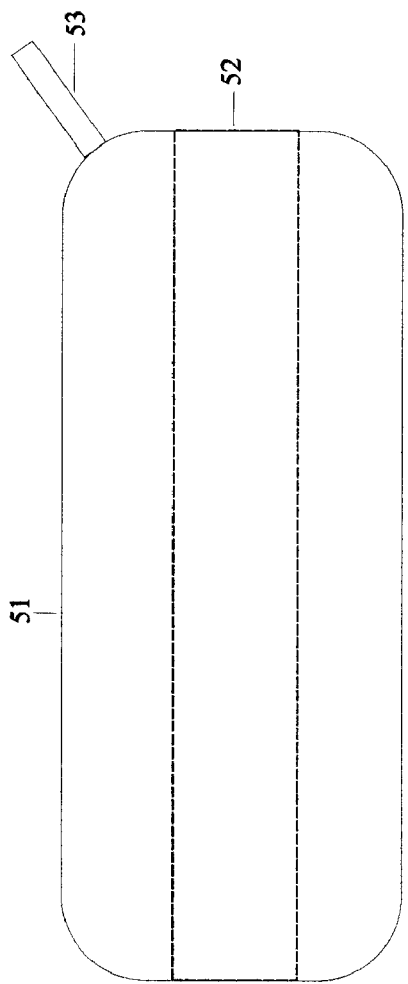
FIG. 20 is an elevational view of one possible construction for an inflatable/expandable packer of FIG. 23 in accord with one embodiment of the present invention.
Figure 21:
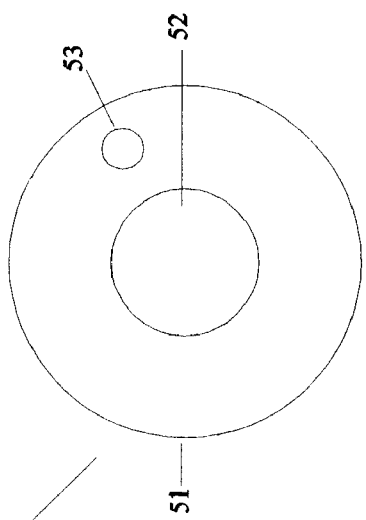
FIG. 21 is an elevational plan view of the inflatable/expandable packer of FIG. 20.

FIG. 20, FIG. 21, and FIG. 23 illustrate packer device 126 which may also be utilized with injection nozzle 102, if desired. Packer device 126 comprises elongated expandable shell 51 constructed of a rubber, neoprene or other suitable material, expandable material with center pass through hole 52 and inflation/deflation valve 53. The packer could be flexible, expandable, compressible, inflatable, or of any other suitable construction to seal as discussed below. Packer device 126 may be inserted into the injection hole and positioned at any desired depth and/or position along injection nozzle 102 as indicated in FIG. 23. Nozzle injection device 102 extends though the center pass through hole 52 and the pneumatic packer device is inflated/deflated via the inflation/deflation valve 53. Upon inflation, such as pneumatically or with liquid, expandable shell 51 expands providing a seal against the nozzle outer sleeve 3 or the extension outer sleeve 4 and the injection hole. In this way, packer device 126 prevents regurgitation of liquids and slurries thereby forcing treatment liquids downward and/or outwardly. A presently preferred packer device 126 operate pneumatically, but other operation means could be utilized. As well, other types of packers such as flexible packer cups, and the like may be used without the need for inflation. For instance, pressure below a packer cup operates to enhance the seal thereof.

The foregoing disclosure and description of the invention is therefore illustrative and explanatory of a presently preferred embodiment of the invention and variations thereof, and it will be appreciated by those skilled in the art, that various changes in the design, organization, order of operation, means of operation, equipment structures and location, methodology, the use of mechanical/electrical/software equivalents, as well as in the details of the illustrated construction or combinations of features of the various elements may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be greatly different from that shown and the invention will still operate well within the spirit of the invention as described hereinbefore and in the appended claims. Thus, various changes and alternatives may be used that are contained within the spirit of the invention.

For instance, although the specification concentrates mainly on the use of a plurality of tubulars, in some cases only one tubular may be inserted. The tubular could be flexible or rigid or a combination of both. Multiple fluids could be pumped separately using one tubular in accord with a preferred method of the invention which would involve sequentially pumping fluids. For instance, when inserting the tubular into the hole, water could be pumped out of the injection ports to aid drilling the hole while the nozzle is moved downwardly. Various elements may be added at selected times or depths during the downward movement. For instance, in one embodiment iron particulates or an iron solution may be added at selected times or depths at selected flow rates during the downward movement of the nozzle. Pulling the nozzle back up the hole, any desired reagents could then be pumped such as hydrogen peroxide or hydrogen dioxide or any desired fluids. Thus, the pumps, valves and fluids may be sequenced to pump a selected fluid, and then another selected fluid. The fluids could be pumped while recording depths, flow rates, pressures, and volume of fluids. Fluids could be pumped sequentially at certain depths or over certain areas. For instance, it may be desired to deliver a selected quantity of a first fluid over a certain range of depths or at a certain depth at a certain flow rate, a second fluid be pumped subsequently over the desired range of depths or at a desired depth at a desired flow rate, a third fluid pumped thereafter at the desired depth or range of depths at another desired flow rate, and so forth. This sequence could be repeated, perhaps automatically by computer control, at each desired depth. The volume, flow rates, pressures, and type of fluids pumped could be logged with respect to depth, if desired. As well, the various parameters or sensor readings such as pH, temperature, or other reactor monitoring means could be used to control the fluid delivery or volume, and could be logged, if desired. The flow rates, volumes, pressures, and so forth may be controlled in response to measured parameters such as temperatures, pH, and so forth. Thus, in one embodiment, a single tubular may be utilized with different products injected sequentially.

Alternatively, multiple tubulars could be utilized with each tubular sequentially pumping different fluids, at different times, flow rates, pressures, and so forth. Thus, many different types of fluids and combinations or reactions could be delivered or produced down hole through a system having three tubulars with selected fluids being sequenced as desired through each of a plurality of tubulars.

Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A substantially self-drilling injection system for insitu remediation of a contaminated media, said substantially self-drilling injection system comprising:
   a substantially self-drilling injection nozzle for penetrating said contaminated media and dispensing one or more fluids comprising at least one liquid into said contaminated media, said injection nozzle comprising:
   a nozzle outer sleeve,
   a plurality of tubulars mounted within said nozzle outer sleeve, said plurality of tubulars defining a plurality of separate fluid pathways within said nozzle outer sleeve, said plurality of tubulars being adjacent each other and being substantially parallel with respect to each other within said nozzle outer sleeve, each of said plurality of tubulars being operable for receiving at least one of said one or more fluids, and at least one injector outlet operable for dispensing said one or more fluids into said contaminated media, said plurality of fluid pathways being sealed with respect to each other along a length thereof until being fluidly interconnected with respect to each other adjacent said at least one injector outlet.

2. The system of claim 1, further comprising:

a mixing chamber mounted adjacent said at least one outlet, said plurality of fluid pathways being in fluid communication with said mixing chamber, said mixing chamber being operable for mixing said one or more fluids prior to said dispensing by said at least one outlet.

3. The system of claim 2, further comprising:

a first pump for pumping a first fluid, said first pump being connected to a first of said plurality of tubulars, a second pump for pumping a second fluid, said second pump being connected to a second of said plurality of tubulars, said first of said plurality of tubulars and said second of said plurality of tubulars being operable for keeping said first fluid and said second fluid separate from each other until said first fluid and said second fluid are mixed in said mixing chamber.

4. The system of claim 1, wherein said plurality of fluid pathways are sealed with respect to each other throughout said injection nozzle such that said plurality of tubulars are operable to prevent said one or more fluids from being mixed until after injection into said media.

5. The system of claim 1, further comprising:

a connector mechanically interconnecting with said plurality of tubulars and said nozzle outer sleeve.

6. The system of claim 5, further comprising:

an injection tip defining therein said at least one injector outlet, said connector mechanically interconnecting with said injection tip.

7. The system of claim 1, farther comprising:

one or more fluid pumps, said one or more fluid pumps being in fluid connection with said plurality of tubulars, said nozzle outer sleeve defining therein a volume, said volume within said nozzle outer sleeve having no fluid connection to said one or more fluid pumps.

8. An injection system for insitu remediation of a contaminated media by dispensing one or more fluids into said contaminated media, said injection system comprising:

a plurality of tubulars affixed together for insertion into said contaminated media, said plurality of tubulars defining a plurality of separate fluid pathways, each of said plurality of tubulars being operably for receiving at least one of said one or more fluids;

at least one injector outlet for dispensing said one or more fluids into said contaminated media; and a mixing chamber, said plurality of fluid pathways being sealed with respect to each until being interconnected with said mixing chamber, said mixing chamber being operable for mixing said one or more fluids prior to dispensing said one or more fluids into said contaminated media through said at least one injector outlet.

9. The system of claim 8, further comprising:

a first pump for pumping a first fluid, said first pump being connected to a first of said plurality of tubulars, a second pump for pumping a second fluid, said second pump being connected to a second of said plurality of tubulars, said first of said plurality of tubulars and said second of said plurality of tubulars being operable for keeping said first fluid and said second fluid separate from each other until said first fluid and said second fluid are mixed in said mixing chamber.

10. The system of claim 8, further comprising:

a nozzle outer sleeve, said nozzle outer sleeve being in surrounding relationship with said plurality of tubulars.

11. The system of claim 8, further comprising:

a plurality of support elements, each of said plurality of support elements defining a plurality of apertures therein, each individual tubular of said plurality of tubulars being received within a respective one of said plurality of apertures such that when said plurality of tubulars are inserted through said plurality of apertures then said plurality of tubulars are mechanically supported with respect to each other.

12. The system of claim 8, further comprising:

each of said plurality of tubulars comprising at least one rigid tubular and at least one flexible tubular interconnected together such that said plurality of tubulars comprises a plurality of interconnections between a plurality of rigid tubulars and a plurality of flexible tubulars whereby each of said plurality of tubulars has a rigid portion and a flexible portion.

13. The system of claim 12, further comprising:

said plurality of interconnections being axially spaced with respect to each other.

14. A substantially self-drilling injection system for insitu remediation of media by injecting one or more fluids into said media, said substantially self-drilling injection system comprising:

a substantially self-drilling injection nozzle;

a plurality of tubulars operable for fluid and mechanical connection with said substantially self-drilling injection nozzle and insertion into said contaminated media, each of said plurality of tubulars being operable for receiving at least one of said one or more fluids, each of said plurality of tubulars comprising at least one rigid tubular and at least one flexible tubular interconnected together such that each of said plurality of tubulars has a rigid portion and a flexible portion;

at least one injector outlet of said substantially self-drilling injection nozzle operable for dispensing said one or more fluids into said contaminated media; and a plurality of support elements, each of said plurality of support elements defining a plurality of apertures therein, each individual tubular of said plurality of tubulars being received within a through said plurality of apertures then said plurality of tubulars are mechanically supported with respect to each other.

15. The injection system of claim 14, further comprising:

an outer nozzle sleeve in surrounding relationship with respect to said plurality of tubulars.

16. The injection system of clam 14, further comprising:

a mixing chamber in fluid communication with said plurality of tubulars.

17. The injection system of claim 16, wherein said mixing chamber is adjacent said at least one injector outlet.

18. The system of claim 16, further comprising:

a first pump for pumping a first fluid, said first pump being connected to a first of said plurality of tubulars, a second pump for pumping a second fluid, said second pump being connected to a second of said plurality of tubulars, said first of said plurality of tubulars and said second of said plurality of tubulars being operable for keeping said first fluid and said second fluid separate from each other until said first fluid and said second fluid are mixed in said mixing chamber.

19. The system of claim 14, further comprising:
a control system operable for sequentially pumping different liquids through one or more tubulars.

20. A substantially self-drilling injection system for in situ remediation of media by injecting one or more fluids into said media said substantially self-drilling injection system comprising:
a substantially self-drilling injection nozzle;
a plurality of tubulars operable for fluid and mechanical connection with said substantially self-drilling injection nozzle and insertion into said contaminated media, each of said plurality of tubulars tubulars being operable for receiving at least one of said one or more fluids, each of said plurality of tubulars comprising at least one rigid tubular and at least one flexible tubular interconnected together such that each of said plurality of tubulars has a rigid portion and a flexible portion;
a plurality of injection outlets for said substantially self-drilling injection nozzle operable for dispensing said one or more fluids into said contaminated media such that each of said plurality tubulars are connected to a respective one or more of said plurality of injection outlets whereby said plurality of fluids within said plurality tubulars are unmixed until after said plurality of injection outlets dispense said one or more fluids into said contaminated media.

21. A method for insitu remediation of a media by injecting one or more fluids into said media, said method comprising:
mechanically interconnecting a nozzle outer sleeve to a substantially self-drilling injection nozzle;
supporting a plurality of tubulars within an interior of said nozzle outer sleeve;
inserting said nozzle outer sleeve and said plurality of tubulars into said media;
pumping one or more fluids comprising at least one liquid through said plurality of tubulars with one or more pumps; and
providing that said interior of said nozzle outer sleeve surrounding said plurality of tubulars is not in fluid communication with said one or more pumps during said insitu remediation of said media; and
mounting said plurality of tubulars parallel with respect to each other within said nozzle outer sleeve.

22. The method of claim 21, further comprising:
providing an electronic communication path through said interior of said nozzle outer sleeve, producing sensor data by electronically sensing one or more physical phenomena, and communicating said sensor data through said electronic communication path.

23. A method for insitu remediation of a media by injecting one or more fluids into said media, said method comprising:
providing a plurality of tubulars such that each of said tubulars are separate from each other;
securing said plurality of tubulars with respect to each other such that said plurality of tubulars are adjacent with respect to each other;
securing said plurality of tubulars to a substantially self-drilling injection nozzle;
inserting said plurality of tubulars and said substantially self-drilling injection nozzle into said media;
pumping one or more fluids comprising at least one liquid through said plurality of tubulars; and
segregating said one or more fluids with respect to each other utilizing said plurality of tubulars until just before or just after injecting said one or more fluids into said media.

24. The method of claim 23, further comprising:
securing said plurality of tubulars parallel with respect to each other within a nozzle outer sleeve.

25. The method of claim 23, further comprising:
pumping a plurality of different fluids through said plurality of tubulars such that said plurality of tubulars keep said plurality of different fluids segregated with respect to each other within said plurality of tubulars until just before or just after injecting said plurality of different fluids into said media.

26. The method of claim 25, further comprising:
mixing said plurality of different fluids in a mixing chamber just before injecting said plurality of different fluids into said media.

27. The method of claim 25, further comprising:
controlling a fluid flow ratio of said plurality of different fluids with respect to each other.

28. A method for insitu remediation of a media, said method comprising:
providing one or more tubulars for connection with a substantially self-drilling injection nozzle;
mounting a first outer sleeve in surrounding relationship to said plurality of tubulars prior to said step of inserting and inserting said one or more tubulars and said substantially self-drilling injection nozzle into said media; and
sequentially injecting a plurality of different fluids into said media through said one or more tubulars and said substantially self-drilling injection nozzle, whereby said plurality of different fluids comprises at least one liquid; and
producing a vacuum outside of said first outer sleeve for removing excess of said plurality of different fluids from said media.

29. The method of claim 28, further comprising:
connecting a second outer sleeve to said first outer sleeve.

30. The method of claim 28, further comprising:
providing that said one or more tubulars comprises at least one rigid tubular and at least one flexible tubular interconnected together.

31. The method of claim 28, further comprising:
remotely controlling one or more pumps for pumping said plurality of different fluids.

32. The method of claim 28, further comprising:
pumping a first fluid at a first selected depth and pumping a second fluid at a second selected depth.

33. A method for insitu remediation of a media said method comprising:
providing a plurality of tubulars for connection with a substantially self-drilling injection nozzle;
inserting said plurality of tubulars and said substantially self-drilling injection nozzle into said media;
sequentially injecting a plurality of different fluids into said media through said plurality of tubulars and said substantially self-drilling injection nozzle, whereby said plurality of different fluids comprises at least one liquid;
providing that each of said plurality of tubulars comprises at least one rigid tubular and at least one flexible tubular interconnected together; and segregating said plurality of different fluids with respect to each other within said plurality of tubulars until just before or just after injecting said plurality of different fluids into said media.

34. The method of claim 33, further comprising:

mixing said plurality of different fluids in a mixing chamber just before injecting said plurality of different fluids into said media.

35. The method of claim 33, further comprising:

mounting a first outer sleeve in surrounding relationship to said one or more tubulars prior to producing a vacuum outside of said first outer sleeve for removing excess of said plurality of different fluids from said media.

* * * * *

UNITED STATES PATENT AND TRADEMARK OFFICE
CERTIFICATE OF CORRECTION

PATENT NO. : 6,733,207 B2
DATED : May 11, 2004
INVENTOR(S) : Liebert et al

It is certified that error appears in the above-identified patent and that said Letters Patent is hereby corrected as shown below:

Column 1,
Lines 23 and 28, delete "existu" and replace with -- exsitu --.

Column 15,
Line 40, delete "farther" and replace with -- further --.
Line 53, delete "operably" and replace with -- operable --.

Column 16,
Line 50, insert -- respective one of said plurality of apertures such that when said plurality of tabulars are inserted -- before "through said plurality…".

Column 17,
Line 10, insert -- , -- after "media".
Line 16, delete one of the "tubulars".
Line 28, insert -- of -- between "plurality" and "tubulars".

Column 18,
Lines 29-30, delete "said step of inserting and".
Line 32, delete "and".
After line 32, insert the paragraph -- inserting said one or more tubulars and said substantially self-drilling injection nozzle into said media; and --.
Line 53, insert -- , -- after "media".

Column 20,
Line 3, delete "one or more" and replace with -- plurality of --.
Line 3, insert -- said step of inserting and -- between "to" and "producing".

Signed and Sealed this

Twenty-seventh Day of July, 2004

JON W. DUDAS
*Acting Director of the United States Patent and Trademark Office*